(12) United States Patent
Gassner

(10) Patent No.: US 11,746,861 B2
(45) Date of Patent: Sep. 5, 2023

(54) LINEAR ACTUATOR, ACTUATOR DEVICE AND ASSEMBLY METHOD THEREOF

(71) Applicant: LIMOSS (DONGGUAN) CO., LTD., Guangdong (CN)

(72) Inventor: Christian Gassner, Guangdong (CN)

(73) Assignee: LIMOSS (DONGGUAN) CO., LTD., Dongguan (CN)

( * ) Notice: Subject to any disclaimer, the term of this patent is extended or adjusted under 35 U.S.C. 154(b) by 42 days.

(21) Appl. No.: 16/644,986

(22) PCT Filed: Nov. 28, 2018

(86) PCT No.: PCT/CN2018/117893
§ 371 (c)(1),
(2) Date: Mar. 6, 2020

(87) PCT Pub. No.: WO2020/107255
PCT Pub. Date: Jun. 4, 2020

(65) Prior Publication Data
US 2020/0408287 A1    Dec. 31, 2020

(51) Int. Cl.
*F16H 25/20*    (2006.01)
(52) U.S. Cl.
CPC ....... *F16H 25/20* (2013.01); *F16H 2025/204* (2013.01)
(58) Field of Classification Search
CPC .............. F16H 25/20; F16H 2025/204; F16H 2025/2481; F16H 2025/2037; F16H 2025/2034; A47C 1/0246; A47C 1/03222
See application file for complete search history.

(56) References Cited

U.S. PATENT DOCUMENTS

| 5,234,386 | A | * | 8/1993 | Nagai | B23Q 1/56 474/148 |
| 5,871,195 | A | * | 2/1999 | Gauger | B60N 2/181 248/419 |
| 5,927,144 | A | * | 7/1999 | Koch | A47C 20/041 74/89.36 |
| 7,717,005 | B2 | * | 5/2010 | Wang | F16H 25/20 74/89.32 |
| 8,534,147 | B2 | * | 9/2013 | Roither | A47C 20/042 74/89.4 |

(Continued)

FOREIGN PATENT DOCUMENTS

CN    101592005 A    12/2009
CN    203348459 U    12/2013
(Continued)

OTHER PUBLICATIONS

International Search Report for PCT/CN2018/117893, dated Aug. 27, 2019, 10 pages.

*Primary Examiner* — Gregory Robert Weber

(57) ABSTRACT

A linear actuator includes: a guide rail assembly; a driving block sleeved on the guide rail assembly, where a top of the driving block is provided with a mounting surface, the mounting surface being disposed above the guide rail assembly and provided with a fixing structure and a prepositioning structure; and an electric motor, configured to actuate the driving block to slide back and forth along a length direction of the guide rail assembly.

6 Claims, 4 Drawing Sheets

(56) References Cited

U.S. PATENT DOCUMENTS

| | | | |
|---|---|---|---|
| 2007/0295524 A1* | 12/2007 | Zimmermann | F16H 25/20 173/217 |
| 2011/0113955 A1* | 5/2011 | Fukano | H02K 7/116 92/172 |
| 2014/0035395 A1* | 2/2014 | Marcantoni | H02K 7/00 310/12.27 |
| 2014/0196555 A1 | 7/2014 | Wu | |
| 2015/0033885 A1* | 2/2015 | Kristen | A47C 1/0242 74/89.23 |
| 2017/0047816 A1* | 2/2017 | Wu | F16H 25/20 |
| 2017/0167583 A1* | 6/2017 | Gassner | A47C 17/04 |
| 2017/0184187 A1* | 6/2017 | Tseng | F16H 25/20 |
| 2017/0299027 A1* | 10/2017 | Kristen | A47C 20/041 |
| 2019/0216220 A1* | 7/2019 | Griggs, Jr. | A47C 1/03211 |
| 2019/0381677 A1* | 12/2019 | Kamon | B25J 17/00 |
| 2020/0309238 A1* | 10/2020 | Homma | F16H 25/20 |

FOREIGN PATENT DOCUMENTS

| | | | | |
|---|---|---|---|---|
| CN | 103795180 A | | 5/2014 | |
| CN | 205319852 U | | 6/2016 | |
| CN | 107588171 A | | 1/2018 | |
| DE | 102013106388 B3 | * | 10/2014 | F16H 25/18 |
| DE | 202016105472 U1 | * | 1/2018 | F16H 25/2015 |

* cited by examiner under 35 U.S.C. 371, of International Patent Application No.
LINEAR ACTUATOR, ACTUATOR DEVICE AND ASSEMBLY METHOD THEREOF

CROSS REFERENCE TO RELATED APPLICATIONS

This is a U.S. National Stage Patent Application, filed
PCT/CN2018/117893, filed Nov. 28, 2018, disclosure of which is incorporated herein by reference in its entirety.

TECHNICAL FIELD

The present disclosure relates to the technical field of actuators, for example, relates to a linear actuator, an actuator device, and an assembly method thereof.

BACKGROUND

A linear actuator is a new type of linear actuator mainly composed of an electric motor, a push rod, a control device and so on, which can be considered as an extension of a rotary motor in terms of structure. Linear actuators are mainly used in external equipment such as electric sofas, electric table lifting rods, industrial electric lifting systems, camera frames, projectors, wedding systems, electric turning beds, and electric nursing beds to drive adjustable parts for attitude adjustment.

In the related art, when the linear actuator is connected to an external member, the actuator and a frame of the external member are typically installed first, then the linkage rod configured to transmit a driving force is fixed to a side wall of the driving block on the actuator by screws. When the linear actuator designed in this way, since the lateral spacing between a screw hole defined in the side wall of the driving block and a beam of the frame is relatively narrow, the frame body needs to be flipped by a preset angle to achieve the connection between the linkage rod and the actuator. Therefore, it becomes time-consuming and laborious when laterally locking the linkage rod and the driving block, which greatly affects the assembly efficiency of the linear actuator.

SUMMARY

The present disclosure provides a linear actuator that is convenient to be connected to an external linkage mechanism, and can effectively avoid the problems caused by the connection with the external linkage mechanism when the mounting surface of the driving block is disposed at a lateral side.

The present disclosure also provides an actuator device with a compact structure, which is structurally stable, and is convenient for assembly between the actuator and the linkage mechanism.

An embodiment provides a linear actuator which includes: a guide rail assembly; a driving block sleeved on the guide rail assembly, where a top of the driving block is provided with a mounting surface, the mounting surface being disposed above the guide rail assembly and includes a fixing structure and a prepositioning structure; and an electric motor configured to actuate the driving block to slide back and forth along a length of the guide rail assembly.

An embodiment provides an actuator device which includes the above linear actuator, and a linkage mechanism configured to connect the linear actuator and an external device. The linkage mechanism includes a connecting seat configured for connecting to a top of the driving block of the linear actuator; and a linkage rod, two ends of which are respectively connected to the connecting seat and the external device.

A method of assembling an actuator device and the actuator device is the above-described actuator device, the method includes:

passing the spindle of the guide rail assembly through the spindle passage of the driving block, and passing the slide guide of the guide rail assembly through the slide guide passage of the driving block, to connect the guide rail assembly to the driving block;

assembling the cable shelf of the driving block under the spindle and slidably connected into the driving block;

respectively assembling the electric motor case and the end cap onto both ends of the guide rail assembly, and housing the electric motor to the electric motor case, to complete installation of the linear actuator;

horizontally fastening the assembled linear actuator to the external device;

hinging the connecting arm of the upper surface of the base of the connecting seat to the linkage rod; and horizontally pre-assembling the base onto the mounting surface of the driving block. wherein a plurality of through holes in the base are coaxially aligned with a plurality of mounting holes on the mounting surface of the driving block. Then, a plurality of screws vertically inserted into the through hole are threadedly connected to the mounting holes, thereby completing the connection between the linear actuator and the linkage mechanism.

DETAILED DESCRIPTION

Figure 1:
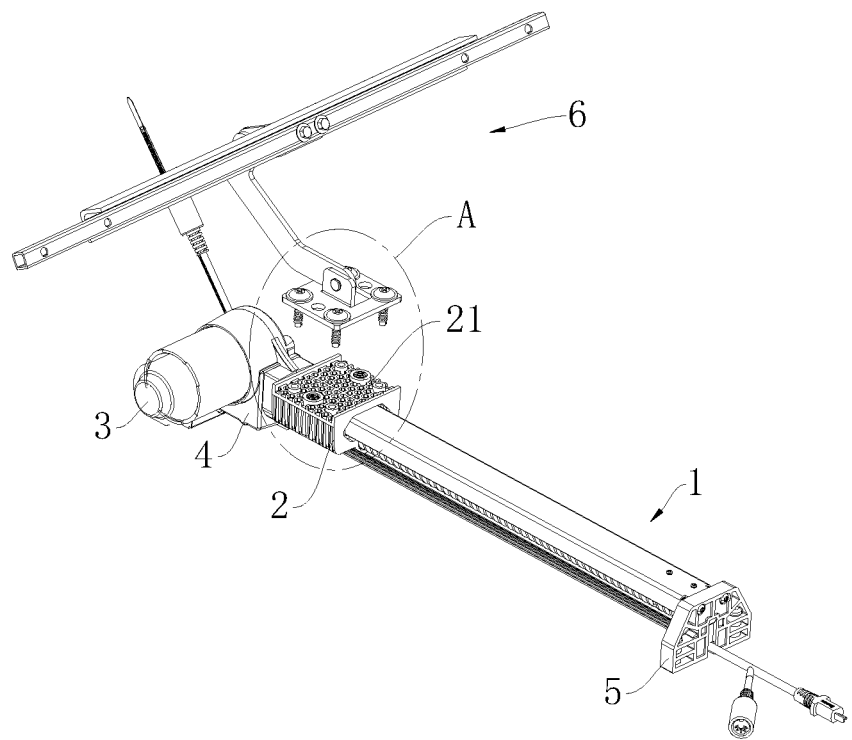
FIG. 1 is an exploded view of an actuator device in accordance with an embodiment of the present disclosure.

In the description of the present disclosure, it should be understood that the orientational or positional relationships indicated by terms "thickness", "upper", "lower", "vertical", "parallel", "bottom", "corner", and the like are based on the orientational or positional relationships illustrated in the drawings, which are for the mere purpose of facilitating and simplifying the description of the present disclosure, and these relationships do not indicate or imply that the device or element referred to has a specific orientation and is constructed and operated in a specific orientation, and thus it is not to be construed as limiting the present disclosure.

In the present disclosure, unless otherwise expressly specified and limited, the term "assembly", "connected" and the like are to be construed in a broad sense, for example, as permanently connected, detachably connected, or integrated; mechanically connected or electrically connected; directly connected to each other or indirectly connected to each other via an intermediary; or internally connected or interactional between two components.

As illustrated in FIG. 1, a linear actuator provided in the present embodiment is installed in an external device, and an adjustment member of the external device is driven by a linkage mechanism to adjust the posture of the external device. The linear actuator includes a guide rail assembly 1, a driving block 2 sleeved on the guide rail assembly 1, and an electric motor 3 configured to actuate the driving block 2 to slide back and forth along a length direction of the guide rail assembly 1. A top of the driving block 2 is provided with a mounting surface 21 which is fastenedly connected to the linkage mechanism, the mounting surface 21 is disposed above the guide rail assembly 1, and the mounting surface 21 is provided with a fixing structure and a prepositioning structure. The mounting surface 21 disposed on the top surface of the driving block 2 can facilitate the fastening connection between the driving block 2 and the linkage mechanism, thereby solving the problems that when the mounting surface of the driving block 2 is disposed on a lateral side, the space is narrow and it is necessary to invert the frame of the external device to be able to be fastened with the external linkage mechanism.

In an embodiment, with reference to FIG. 1 to FIG. 5, in this embodiment, two ends of the guide rail assembly 1 are respectively provided with an electric motor case 4 and an end cap 5, the guide rail assembly 1 includes a spindle 11, a slide guide 12, and a cable shelf 13. A first end of the spindle 11 is connected to the electric motor 3 assembled in the electric motor case 4 and a second end of the spindle 11 is threadly connected to the end cap 5. The slide guide 12 is disposed above the spindle 11 and runs parallel to and is spaced apart from the spindle 11, and two ends of the slide guide 12 are respectively fixed to the end cap 5 and to the electric motor case 4. The cable shelf 13 is disposed under the spindle 11 and runs parallel to and is spaced apart from the spindle 11, and two ends of cable shelf 13 are respectively fixed to the end cap 5 and to the electric motor case 4.

The driving block 2 in the present embodiment is sleeved onto the slide guide 12 and the spindle 11 at the same time, and is configured to do a reciprocating motion along a length direction of the slide guide 12 and the spindle 11. Along a moving direction of the driving block 2, a slide guide passage 22 and a spindle passage 23 is defined to go through the driving block 2, and the slide guide passage 22 is configured to be slidably engaged with the slide guide 12. And the spindle passage 23 is located below the slide guide passage 22 and is threadedly connected with the spindle 11.

In order to avoid interference between the spindle passage 23 and the slide guide passage 22, in this embodiment, the spindle passage 23 is configured to be separated from the slide guide passage 22, and a lower portion of an outer peripheral surface of the spindle passage 23 is exposed from a bottom surface of the driving block 2.

With the linear actuator of the above structural design, in order to facilitate the installation of the linkage mechanism connected to the driving block 2 above the guide rail assembly 1, in the present embodiment, a mounting surface 21 is disposed on the top surface of the driving block 2, and the mounting surface 21 is provided with a fixing structure and a prepositioning structure.

In an embodiment, the fixing structure is a plurality of mounting holes that are vertically disposed on the mounting surface. End faces of upper ports of the plurality of mounting holes are disposed on the same plane and are higher than the mounting surface 21. The plurality of mounting holes includes a threaded hole 211 and a connection hole 212, the inner wall of the threaded hole 211 is provided with a female screw, but the inner wall of the connection hole 212 is a smooth surface. By means of locking screws from top to bottom, the quick installation of the linkage mechanism and the above-mentioned driving block 2 can be conveniently implemented from above the mounting surface 21. Whether using an electric screwdriver or an ordinary screwdriver, it saves time and effort, thereby solving the problems that when the mounting hole is disposed on a lateral side of the driving block 2, the space is narrow and it is necessary to flip the frame to be able to realize the installation.

In an embodiment, in order to facilitate the linkage mechanism to be accurately positioned when engaged with the mounting hole on the mounting surface 21 of the driving block 2. In the present embodiment, the prepositioning structure includes a first positioning wall 213a and a second positioning wall 213b both protruding from an edge of the mounting surface 21. The top surface of the first positioning wall 213a and the top surface of the second positioning wall 213b are both higher than the upper end of a threaded hole 211 and the upper end of the connection hole 212. In installation, the lower bottom surface of the connecting seat of the linkage mechanism can be closely attached to the upper end of the screw hole 211 and the connection hole 212, and forming an effective limit on the two edges of the connecting seat through the first positioning wall 213a and the second positioning wall 213b on both sides of the mounting surface 21 to prevent the connecting seat from moving left and right when fastened with the driving block 2, then effectively improve the accuracy of positioning, and the assembly efficiency of the connecting seat and the driving block.

In an embodiment, a first blocking slot (not shown) may be further disposed on an inner sidewall of the first positioning wall 213a and an inner sidewall of the second positioning wall 213b, the first blocking slot engages with the edge of the connecting seat of the linkage mechanism. That is, the edge of the connecting seat of the linkage mechanism slides into the first blocking slot along the length of the first blocking slot. Then the connecting seat and the mounting hole are locked by the screws 7, thereby realizing the quick connection between the external linkage mechanism and the driving block 2.

In addition, in the present embodiment, in order to prevent the driving block 2 from shrinking due to uneven thickness in processing, in the present embodiment, the outer surface of the driving block 2 is provided with a cutout hole 214 and a cutout groove 215 for preventing shrinkage, and is also capable of effectively improving the strength of the driving block 2 through a plurality of ribs formed between the adjacent cutout hole 214 and the adjacent cutout groove 215.

In an embodiment, in order to facilitate the installation of the cable shelf 13, the opposite sides of the lower portion of the outer peripheral surface of the spindle passage 23 are outwardly convexly provided with a positioning flange 231. And the positioning flange 231 and the bottom surface of the driving block 2 define a second blocking slot 24 configured to be engaged with the cable shelf 13. In addition, in order to reduce the dust falling into the spindle 11, the slide guide 12 in the embodiment can be as a protective cover having an inverted U-shaped cross section, and the slide guide 12 is disposed above the spindle 11.

Figure 2:
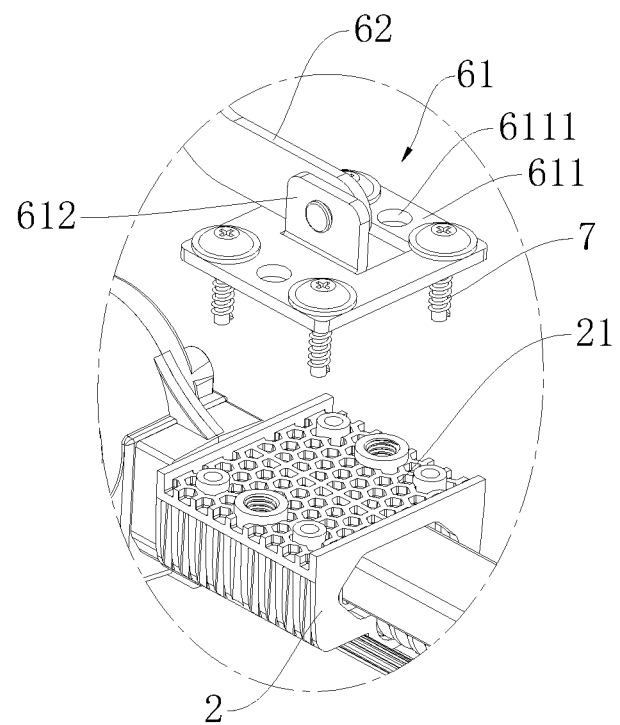
FIG. 2 is a partial enlarged view of part A of FIG. 1.
Figure 3:
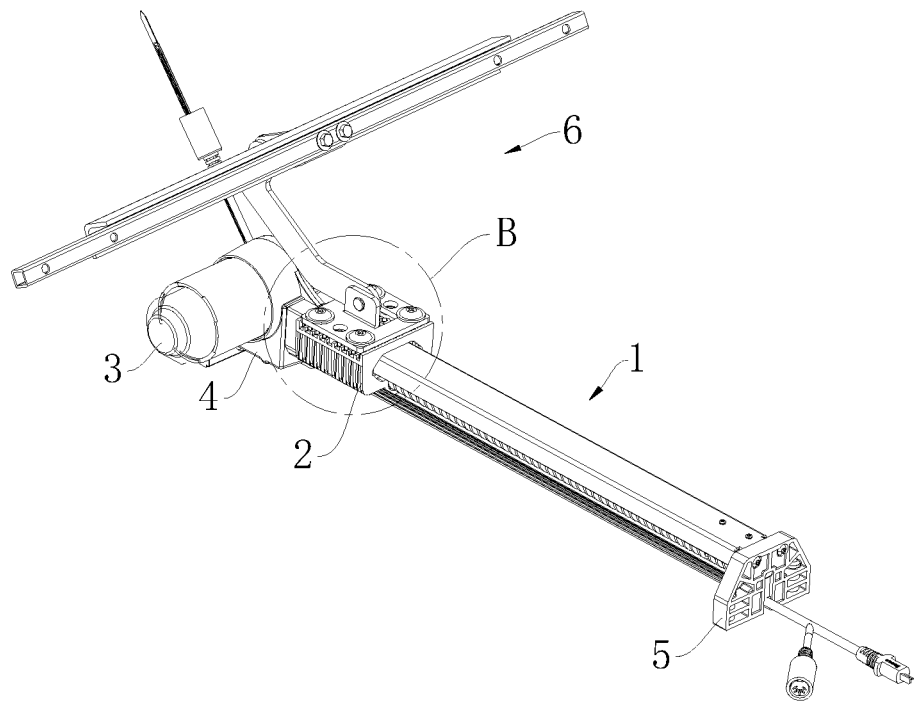
FIG. 3 is an assembly view of an actuator device in accordance with an embodiment of the present disclosure.
Figure 4:
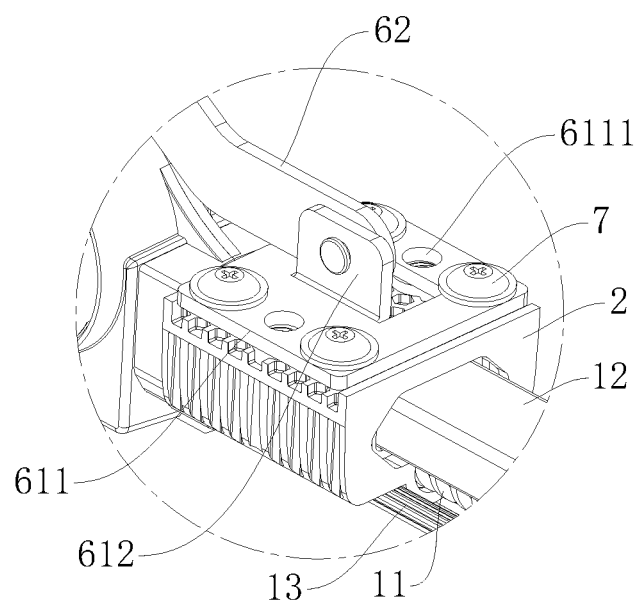
FIG. 4 is a partial enlarged view of part B of FIG. 3.
Figure 5:
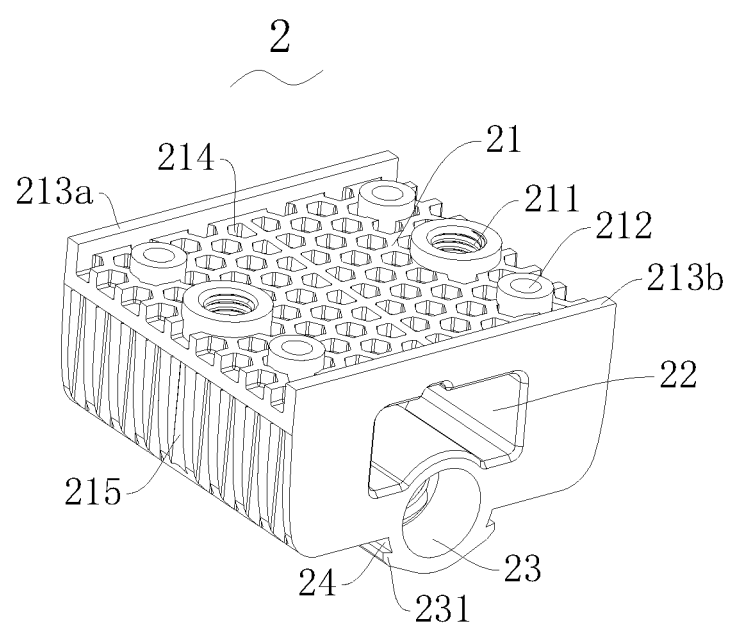
FIG. 5 is a perspective view of the driving blocking of FIG. 1.

The present embodiment further provides an actuator device, as illustrated in FIG. 2, the actuator device includes the above-mentioned linear actuator, and a linkage mechanism configured to connect the linear actuator and an external device. The linkage mechanism includes a connecting seat 61 and a linkage rod 62. The connecting seat 61 is configured for connecting to a top of the driving block 2 of the linear actuator, the two ends of the linkage rod 62 are respectively connected to the connecting seat 61 and the external device.

The connecting seat 61 in the present embodiment includes a base 611 that is configured to be fastened to the mounting surface 21 of the driving block 2. A plurality of through holes 6111 are defined through the upper surface of the base 611 and the through holes 6111 are configured in a one-to-one correspondence with the threaded holes 211 and the connection holes 212. Therefore, the screws can be easily fastened to the mounting holes through the through hole 6111 from above the mounting surface 21, thereby conveniently and quickly facilitating the fastening between the connecting seat 61 and the driving block 2. Which solves the problems that when the mounting hole is disposed on a lateral side of the driving block 2, the space is narrow and it is necessary to invert the frame to be able to realize the fastening between the connecting seat 61 and the driving block 2.

In the present embodiment, the connecting seat 61 further includes a connecting arm 612 integrally provided with the base and bent in a direction perpendicular to the base, the connecting arm 612 is disposed at a middle portion of the upper surface of the base 611, and both ends of the linkage rod 62 are respectively hinged with the connecting arm 612 and the external device. The external device in the present embodiment may be provided as a sofa back, or may be provided as a table and chair capable of adjusting the height or angle.

The base 611 in the present embodiment is designed in a plate shape, and the connecting arm 612 and the base 611 are integrally formed by stamping with a sheet metal. And the through holes 6111 are configured in two groups, which are symmetrically distributed on both sides of the connecting arm 612, thereby effectively improving the stability and reliability of the connection between the base 611 and the driving block 2.

Figure 6:
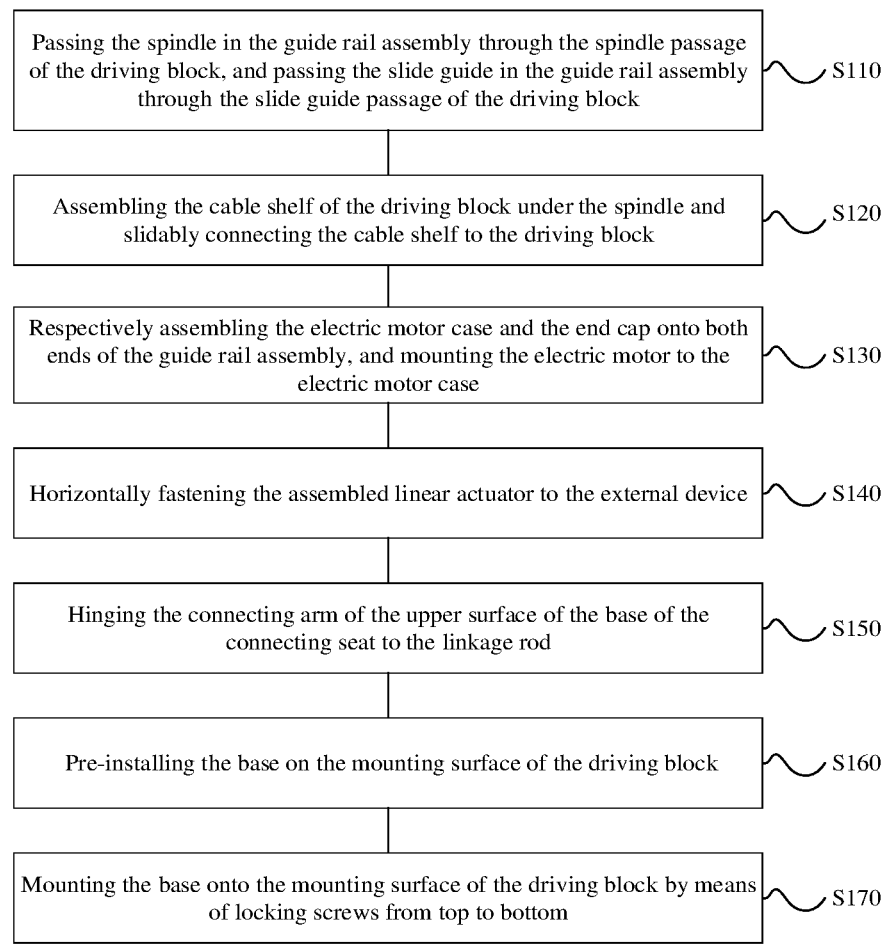
FIG. 6 is a flow chart of a method for assembling an actuator device in accordance with an embodiment of the present disclosure.

The embodiment further provides a method for assembling an actuator device, and the above-mentioned actuator device is assembled by the method. As illustrated in FIG. 6, the method includes:

In step 110, pass the spindle 11 of the guide rail assembly 11 through the spindle passage 23 of the driving block 2, and pass the slide guide 12 through the slide guide passage 22 to connect the guide rail assembly 1 into the driving block 2;

In step 120, assemble the cable shelf 13 under the spindle 11 and slidably connected into the driving block 2;

In step 130, respectively assemble the electric motor case 4 and the end cap 5 onto both ends of the guide rail assembly 1, and assemble the electric motor 3 to the electric motor case 4, to complete installation of the linear actuator;

In step 140, horizontally fasten the assembled linear actuator to the external device;

In a step 150, hinge the connecting arm 612 to the linkage rod 62;

In step 140, pre-install the base 611 on the mounting surface 21 of the driving block 2; and In step 170, assemble the base 611 to the mounting surface of the driving block 2 through locking the screw from top to bottom. The plurality of through holes 6111 on the base 611 are coaxially aligned with the plurality of mounting holes on the mounting surface 21 of the driving block 2, and is threadedly connected to the mounting hole through screws 7 that is vertically inserted into the through hole 6111, thereby realizing the connection between the linear actuator and the linkage mechanism.

Installed by the above method, by a means of locking screws from top to bottom, it can be conveniently realized the quick installation between the linkage mechanism and the above-mentioned driving block 2 from above the mounting surface 21. Whether using an electric screwdriver or an ordinary screwdriver, it saves time and effort, thereby solving the problems that when the mounting hole is disposed on a lateral side of the driving block 2, the space is narrow and it is necessary to invert the frame.

What is claimed is:

1. A linear actuator, comprising:
a guide rail assembly;
a driving block, sleeved on the guide rail assembly, wherein a top of the driving block is provided with a horizontal mounting top surface, and the horizontal mounting top surface is disposed above the guide rail assembly, the mounting top surface being provided with a fixing structure and a prepositioning structure; and
an electric motor, configured to actuate the driving block to slide back and forth along a length direction of the guide rail assembly;
wherein the fixing structure comprises a plurality of mounting holes, and each of the plurality of mounting holes is arranged on the horizontal mounting top surface and vertically extends downward from the horizontal mounting top surface, wherein upper ends of the plurality of mounting holes are located on a same horizontal plane and are higher than the horizontal mounting top surface, and the fixing structure arranged on the horizontal mounting top surface is capable of providing a means of locking screws from top to bottom to be fixed to a connecting seat of a linkage mechanism; and
wherein an outer surface of the driving block is provided with at least one of a cutout hole and a cutout groove, and a plurality of ribs formed between an adjacent cutout hole and an adjacent cutout groove;
an electric motor case and an end cap which are respectively disposed at two ends of the guide rail assembly, the guide rail assembly comprising a spindle, a slide guide and a cable shelf;
wherein the slide guide is disposed above the spindle and runs parallel to and is spaced apart from the spindle, and two ends of the slide guide are respectively fixed to the end cap and to the electric motor case;
wherein the cable shelf is disposed under the spindle and runs parallel to and is spaced apart from the spindle, and the two ends of the cable shelf are respectively fixed to the end cap and to the electric motor case;
wherein through the driving block is defined a slide guide passage and a spindle passage, the slide guide passage is slidably engaged with the slide guide and the spindle passage is threadedly connected to the spindle, wherein the slide guide passage and the spindle passage both extend in a direction of movement of the driving block, and the spindle passage is located below the slide guide passage;
wherein the spindle passage and the slide guide passage are spaced apart from each other, and a lower portion of an outer peripheral surface of the spindle passage is exposed from a bottom surface of the driving block;
wherein positioning flanges are disposed at and outwardly protrude from opposite sides of the lower portion of the outer peripheral surface of the spindle passage, and a blocking slot is formed between the positioning flange and the bottom surface of the driving block and is configured to be engaged with the cable shelf.

2. The linear actuator according to claim 1, wherein the plurality of mounting holes comprise a threaded hole having a hole wall provided with a female thread and a connection hole having a hole wall provided with a smooth surface.

3. The linear actuator according to claim 1, wherein the prepositioning structure is a positioning wall protruding from an edge of the mounting top surface, and a top surface of the positioning wall is higher than the upper ends of the plurality of mounting holes.

4. The linear actuator according to claim 3,
wherein a first end of the spindle is connected to the electric motor in the electric motor case and a second end of the spindle is connected to the end cap.

5. The linear actuator according to claim 4, wherein the driving block is sleeved onto both of the slide guide and the spindle, and is configured to do a reciprocating motion along a length direction of the slide guide and the spindle.

6. The linear actuator according to claim 4, wherein the slide guide is a protective cover with an inverted U-shaped cross section, and the slide guide covers above the spindle.

\* \* \* \* \*